US005274608A

United States Patent [19]

Graham

[11] Patent Number: 5,274,608

[45] Date of Patent: Dec. 28, 1993

[54] SONAR TRANSDUCER

[75] Inventor: Walton Graham, Roslyn, N.Y.

[73] Assignee: Ceridian Corporation, Minneapolis, Minn.

[21] Appl. No.: 412,602

[22] Filed: Nov. 18, 1964

[51] Int. Cl.[5] .............................................. G01S 15/00

[52] U.S. Cl. .................................... 367/137; 367/131; 367/158

[58] Field of Search ..................... 340/8, 8 MM, 10, 5, 340/14; 367/131, 158, 163, 137, 165

[56] References Cited

U.S. PATENT DOCUMENTS 2,407,662 9/1946 Hart .................................... 367/158
2,454,264 11/1948 Stigter ................................ 367/165
2,977,572 3/1961 Pope .................................... 367/163
3,068,446 12/1962 Ehrlich ................................ 367/105

*Primary Examiner*—Daniel T. Pihulic
*Attorney, Agent, or Firm*—Kinney & Lange

[57] ABSTRACT

A sonar transducer includes an electro-mechanical transducer coupled to a front mass and a back mass. Annular rings space a compliant diaphragm from the front mass, the diaphragm being in communication with the liquid to which the sonar transducer is exposed. The compliance of the diaphragm is selected to tune the sonar transducer to eliminate reactive components of the impedance of the combined sonar transducer and liquid medium load, and to maximize the radiation resistance of the system.

14 Claims, 2 Drawing Sheets

SONAR TRANSDUCER

Figure 1:
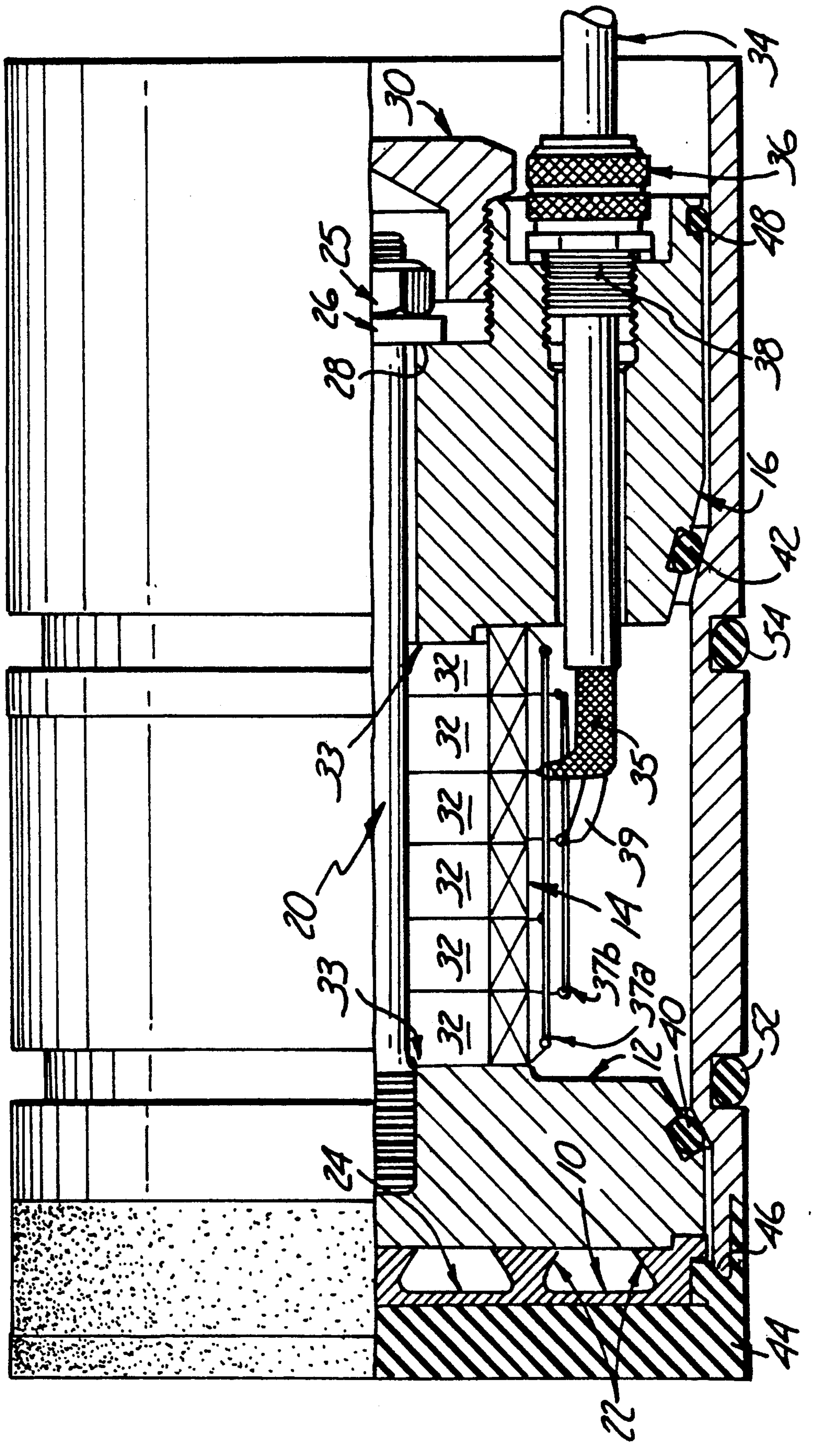

This invention relates to sonar equipment and more particularly, to a sonar transducer having a compliant front mass for the sonar signal transmitting and receiving element.

Sonar transducer mounting arrangements may be generally classed into two broad types, the first being the exposed type with the transducer extending beneath the hull, the transducer usually being shielded by a sonar dome. This is the conventional type sonar presently in general use. The second broad group is the conformal type where the transducer is recessed into the hull of the ship with only the transducer transmitting and receiving surface exposed to the water. This surface is made flush with the hull to avoid noise resulting from water turbulence and cavitation. Conformal sonar systems normally employ an array of differentially phased transducers to permit directional scanning about the full 360° bearing circle without actual physical rotation of the array.

This invention relates to the conformal type sonar.

The requirements for a transducer element used in conformal sonar systems are more exacting than for conventional sonars. The desire to "steer" the conformal array to endfire (directly forward or aft) imposes a limit on the diameter of the individual elements in order to avoid significant system degradation due to element directivity. This constraint makes the maximum ratio of element diameter to wavelength (at the highest operating frequency) about one-quarter.

The normalized radiation resistance varies as the square of this ratio, and has, therefore, a value of approximately one-quarter of that of a half-wave element. Both the efficiency and the bandwidth of the element decrease with the radiation resistance.

A low efficiency is undesirable because of the wasted power and heating of the ceramic drive element. A low bandwidth is undesirable because it restricts the number of frequencies available for multiple pulsing (for achieving a high data rate) or for minimizing the interference among a group of/ASW ships.

Still another constraint on the design of the element is that it must have an internal impedance (the impedance seen looking into the acoustical terminals), which is high compared with the radiation impedance, in order that velocity control can be readily achieved in transmission, and beams can be readily formed in reception. Finally, the element must possess good shock and vibration characteristics and a high (cavitation-limited) acoustic power output.

In transducers made in accordance with the invention, a compliant front mass is employed for the transmitting and receiving element of the transducer. This compliant front mass comprises a diaphragm multiply supported along annular rings to the face of a relatively rigid piston, the combination of which forms the front mass of the transducer. The transducer is housed in a sea chest built in the hull of the ship and may include a resonant cavity between the outer surface of the compliant front mass and the outer edge of the sea chest. The operation of the resonant cavity is discussed in "Cavity Loaded Resonators", Journal of Acoustic Society, Vol. 34, p. 1264 (1962) and forms no part of this invention. The compliant front mass may be tuned in a manner described below to extend the frequency response of the transducer and to lessen the effects of load impedance variation. Also, mounting of the diaphragm on a plurality of annular rings in accordance with the invention substantially raises the otherwise impedimentary cavitation limitation of the acoustic power output.

Figure 2:
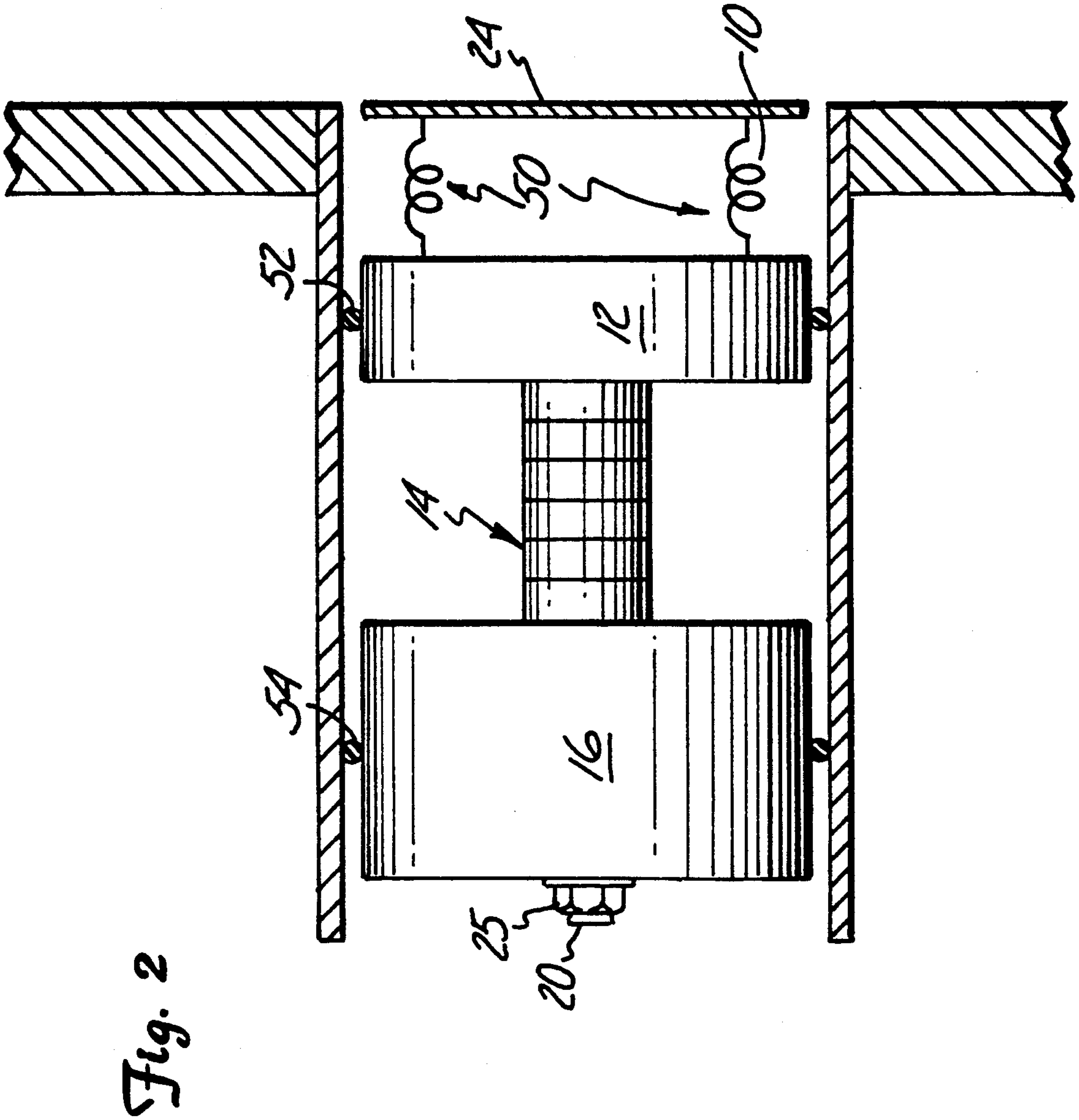

The invention will be more fully described and understood in the following detailed description, which is to be read in connection with the accompanying drawings wherein:

FIG. 1 is an elevational view in partial cross-section of a transducer made in accordance with the invention; and FIG. 2 is a schematic representation of the transducer illustrated in FIG. 1 to aid in explaining the mechanical relationship between the various elements.

Referring to FIG. 1 the transducer comprises six principal elements, namely, front compliance 10, front mass 12, piezoelectric stack 14, back mass 16, all of which are held together as a unit inside shell 18 by tension rod 20. All of these elements are of circular transverse cross-section.

Front compliance 10 is a circular member having annular rings 22 which support and space diaphragm 24 from front mass 12. The front compliance 10 may be machined from solid aluminum stock to provide an effective and inexpensive element.

Front compliance 10 is joined to the front end of front mass 12 by a suitable bonding agency such as an epoxy adhesive bond along the interfaces between rings 22 and front mass 12. Front mass 12 may likewise be machined or otherwise formed from solid aluminum stock.

Front mass 12 is held against piezoelectric stack 14 by tension rod 20, which is threaded at one end to front mass 12 and at the opposite end to spherical nut 25 which bears against washer 26 and through it against the periphery of hole 28 drilled through back mass 16. Connecting these elements in this manner by spherical nut 25 insures that rod 20 exerts only compressive stress on piezoelectric stack 14 with no attendant bending or shearing stresses on stack 14 or front or back mass 12 and 16. Cap 30 threads into the back end of back mass 16 to protect against damage or jarring of tension rod 20. Cap 30 and back mass 16 may be satisfactorily fabricated from solid brass stock by machining or the like.

Piezoelectric stack 14 in the illustrated embodiment in FIG. 1 is an assembly of PZT 4 ceramic rings 32. Rings 32 are arranged in alternating polarity and are connected electrically and mechanically by nickel grids embedded in an epoxy bonding agent. The ends of stack 14 are isolated from the front and rear masses 12 and 16 by thin mylar films 33 which provide good electrical insulation and lubricity to allow the stack 14 to expand radially when heated, thus avoiding shearing stresses at this surface. The danger of chipping stack 14 is also reduced by mylar films 33 which provide highly localized compliances which are negligible to the overall transducer characteristic.

Stack 14 is mechanically preloaded by tension rod 20, the preload being applied by advancing spherical nut 25 while being measured by metering the electrical charge developed in stack 14 by a ballistic galvanometer. Electrical current is supplied to or extracted from stack 14 by cable 34 which is joined to cable terminal 38 in back mass 16 by watertight cable clamp 36. Outer conductor 35 of cable 34 is conductively connected to a buss 37*a* which interconnects alternate conductive grid interfaces (not shown) between piezoelectric elements 32. Center conductor 39 of cable 34 is conductively connected through buss 37*b* to the remaining conductive grid interfaces to complete the parallel electrical connection of the series of piezoelectric elements 32.

All of the above connected elements are supported radially and axially in shell 18 by a pair of "O" rings 40 and 42 between beveled surfaces of front and back masses 12 and 16, respectively, and matching beveled surfaces of shell 18. This arrangement physically aligns and isolates the front and back masses 12 and 16 from shell 18 and also results in a mechanically floating design which provides shock isolation and prevents the build up of internal stresses. In addition, "O" rings 46 and 48 may be employed for further radial support.

To insure a watertight seal, boot 44, having a characteristic impedance close to that of water, is bonded to front mass 12. Experiments have shown RTV silicone rubber satisfactory for this application.

Added protection against shock damage is provided by a second set of "O" Rings 52 and 54 positioned between shell 18 and the sea chest (not shown) in which the transducer is positioned. Rings 52 and 54 are relatively soft and act as vibration mounts, whereas the earlier referred set 40, 42, 46 and 48 are relatively hard and act as shock isolators.

Referring to FIG. 2 the schematic relationship between the various components of the transducer is shown. Front compliance 10 is represented as springs 50 supporting diaphragm 24 and front mass 12.

In order to explain certain important features of the invention, it is convenient to utilize the known analogy between mechanically vibrating structures and alternating current electrical circuits. In fact, heavy reliance is placed upon this technique in the design of the transducer.

This transducer design uses a mechanical compliance (the electrical analog of which is a capacitance) in series with the radiation load to "tune" the radiation load, which is analogous to increasing the resistive component of the electrical impedance seen by an electrical radiating element. In the electrical impedance analog, the compliance (capacitance) appears in parallel with the radiation load, producing a parallel resonant circuit. The increase in the radiation resistance makes it possible to achieve both a high efficiency and a high bandwidth in an element with a diameter that varies approximately from only $\frac{1}{8}$ to $\frac{1}{4}$ the wavelength over its operating frequency range. As an added advantage, it is possible to design the compliance to be more flexible at the center than at the edge of the piston to vary the velocity (and pressure) distribution across the face of the piston in such a way as to give a higher cavitation limitation on power output than for a rigid piston of the same size.

The explanation of how the compliant front mass of the transducer leads to larger available bandwidth and greater efficiency can best be explained by consideration of the electrical circuit analogs for the acoustic transducer system.

The maximum attainable bandwidth for either a mechanical or electrical system is limited by the "Q" (which for these purposes may be considered to be the ratio of the imaginary part of this impedance to its real part) of the load impedance; the smaller the "Q", the larger the available bandwidth.

Known techniques allow one to calculate the mechanical impedance of a rigid piston in an infinitely rigid flat baffle loaded on one side ("Acoustics", pages 118, to 119, by Leo Beranek, Published by McGraw-Hill, 1954), which approximates the basic structure of acoustic transducers according to the prior art. The non-directionality constraint of a $\lambda/4$ (approximately) piston face diameter results in a theoretical "Q" of approximately 2 for the acoustic load. This size element usually yields a narrow operating bandwidth in a conventional design.

A study of the nature of this load impedance was made for a 4.5 inch diameter element by considering electrical analogs. The acoustic impedance was normalized to a selected value of 5,000 ohms. The electrical analogous component values for this load are relatively independent of frequency. A parallel resistance of 21.7KΩ and inductance of 0.54 henries characterize the acoustic load with adequate accuracy in the frequency range of interest (vicinity of 3.5Kc).

Having found that the load can be represented as an inductor in parallel with a resistor, the simplest measure for achieving the largest bandwidth, is to parallel resonate this load with a "capacitor". This will yield, in the neighborhood of resonance, a resistance which is approximately equal to 21.7KΩ over a rather large frequency bandwidth. It should be noted that parallel resonating the radiation load with a capacitor transforms the acoustic load impedance from 4.8KΩ to 21.7KΩ. This measure improves the efficiency by increasing the impedance level of the acoustic load without reducing the maximum bandwidth capabilities.

As previously mentioned, further advantage can be obtained with the compliant front mass by designing it to be more compliant near the center and less compliant near the periphery. By this technique, a transducer having a front mass of a given diameter can be driven at higher power before its operation becomes adversely affected by cavitation. An understanding of this advantageous feature can be gained by considering a prior art rigid front mass as an effectively rigid piston. The velocity distribution across the face of such a piston necessarily is uniform. However, the pressure distribution is peaked at the center of the transducer (which is assumed to be small compared with one wavelength) because the pressure is not as effectively concentrated around the edges of the piston as it is at the center.

It therefore becomes apparent that cavitation, which is a function of pressure, commences at the center of the piston before the average pressure across the piston reaches a critical level. It is therefore desirable to render the pressure distribution across the face of the piston more nearly uniform. This is accomplished according to the present invention by creating a non-uniform velocity distribution with greater velocity at the edges of the front mass and a lesser velocity at the center. This is readily accomplished by causing the compliant front mass to be more compliant near its center, either by decreasing the diaphragm thickness in the center of the front mass, or increasing the spacing of rings 22, or by any other suitable expedient.

From the foregoing explanation, it will be seen that the transducer with compliant front mass produces valuable advantages among which are increased bandwidth, operating efficiency, and cavitation threshold power.

While this description has been directed to certain specific structures, it should be understood that it relates only to certain preferred embodiments of my invention and that further modifications and improvements thereto will be obvious to those skilled in the art. The above description is given by way of example only, rather than by way of limitation. I therefore intend not to be limited by this description, but rather to be accorded the scope of invention as recited in the following claims.

What is claimed is:

1. A sonar transducer for coupling electro-mechanical energy to a liquid medium comprising a vibratory rigid mass, an electro-mechanical transducer coupled to said mass for generating or sensing vibrations of said mass corresponding to sonar signals, compliant means for coupling said mass to said liquid medium comprising a member of small transverse dimension compared to a wavelength of the vibration frequency and having a compliant surface communicating with said liquid, the compliance of said surface being determined to tune the sonar transducer to substantially eliminate the reactive component of the impedance of the combined sonar transducer and liquid medium load.

2. A sonar transducer as claimed in claim 1 wherein the compliance of said compliant means is non-uniform across the surface thereof being less near the periphery of the surface than at the center thereof.

3. A sonar transducer as claimed in claim 1 wherein said compliant means is formed of metal and comprises annular ring supports between said surface and said mass.

4. A sonar transducer as claimed in claim 1 wherein said electro-mechanical transducer is secured to a back mass larger than said vibratory rigid mass and both are mounted with limited axial freedom of movement in a cylindrical housing.

5. A sonar transducer as claimed in claim 1 wherein said electro-mechanical transducer comprises a plurality of piezoelectric elements.

6. A sonar transducer as claimed in claim 5 wherein said plurality of piezoelectric elements are connected physically in series and are connected electrically in parallel.

7. A sonar transducer as claimed in claim 1 wherein said compliant means comprises a circular metal diaphragm secured to said rigid mass by at least one ring support concentric with said diaphragm.

8. A sonar transducer as claimed in claim 7 wherein said compliant means is secured on said rigid mass by a plurality of concentric support rings.

9. A sonar transducer as claimed in claim 1 further comprising a shell within which said coupled transducer and mass is housed, said shell being adapted to be housed in a sea chest in the hull of a ship, said coupled transducer and mass and said shell having two pairs of opposite and spaced annular bevels, the bearing surfaces of said pairs of bevels being disposed at an angle to each other and at an angle to the radial and axial orientation of said coupled transducer and mass, and bands of compressible material squeezed between said bevels to position said coupled transducer and mass in said shell, the angle between said pairs of bevels and the transverse area and compressibility of said bands being selected to exert inward radial and opposed axial pressure from said shell to said coupled transducer and mass.

10. A sonar transducer as claimed in claim 9 further comprising one or more bands of compressible material around said shell, the transverse area and compressibility of said bands being selected to exert radial pressure between said shell and the sea chest in which said shell is to be housed.

11. A sonar transducer as claimed in claim 10 wherein said electro-mechanical transducer comprises a piezoelectric member and means for coupling said member to said vibratory rigid mass by pressure applied against one end of said member, said coupling means comprising a fastener having a spherically shaped bearing surface, an intermediate bearing plate having on one side a spherically shaped surface for engaging said fastener surface and on the opposite side a surface similar to said end of said piezoelectric member for engagement therewith, and means for moving said fastener against said plate with the spherically shaped surfaces of each in engagement so as to press the opposite face of said plate against the end of said piezoelectric member whereby said piezoelectric member is mechanically coupled to said vibratory rigid mass.

12. A sonar transducer as claimed in claim 11 further comprising a first electrical insulating and lubricative film between said piezoelectric member and said vibratory rigid mass and a second such film between said piezoelectric member and said coupling means.

13. The method of transmitting and receiving sonar signals comprising generating sonar signal vibrations of a desired frequency bandwidth, transmitting said vibrations through a flexibly supported compliance means, receiving a return sonar signal by induced vibration of said compliance means, and sensing said return signal, the compliance of said compliance means being selected to balance and substantially eliminate the reactive component of the combined transducer and load impedance and maximize the radiation resistance of the system.

14. The method of transmitting and receiving sonar signals as claimed in claim 13 wherein said transmitting and receiving steps comprise vibrating a compliant metal diaphragm.

* * * * *

UNITED STATES PATENT AND TRADEMARK OFFICE
CERTIFICATE OF CORRECTION

PATENT NO. : 5,274,608
DATED : December 28, 1993
INVENTOR(S) : Walton Graham, et. al.

It is certified that error appears in the above-indentified patent and that said Letters Patent is hereby corrected as shown below:

On the Title page, item [75], Inventor: should be --Walton Graham, Roslyn, Tulio De Filippis, North Woodmere, both of N.Y.
Column 1, line 43, delete "of/", insert --of--.

Signed and Sealed this

Nineteenth Day of July, 1994

Attest:

Bruce Lehman

BRUCE LEHMAN

*Attesting Officer* *Commissioner of Patents and Trademarks*